May 7, 1935.   R. H. DART   2,000,126
LINING COLLAR FOR FRUIT BOXES
Filed Jan. 13, 1930
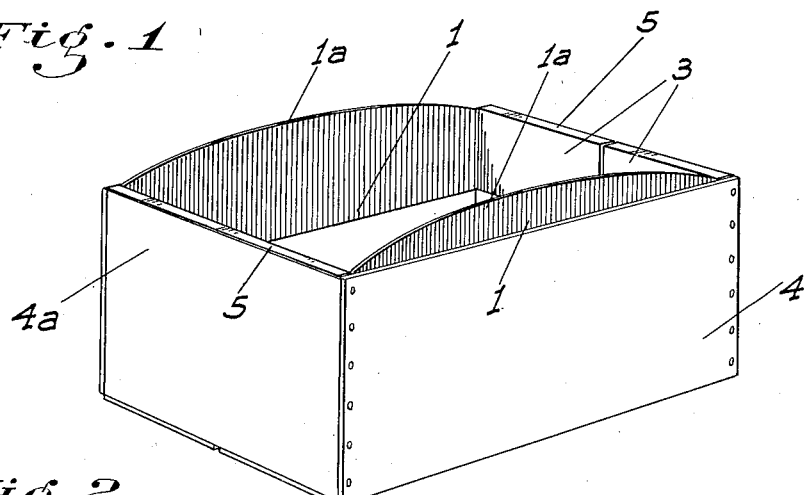
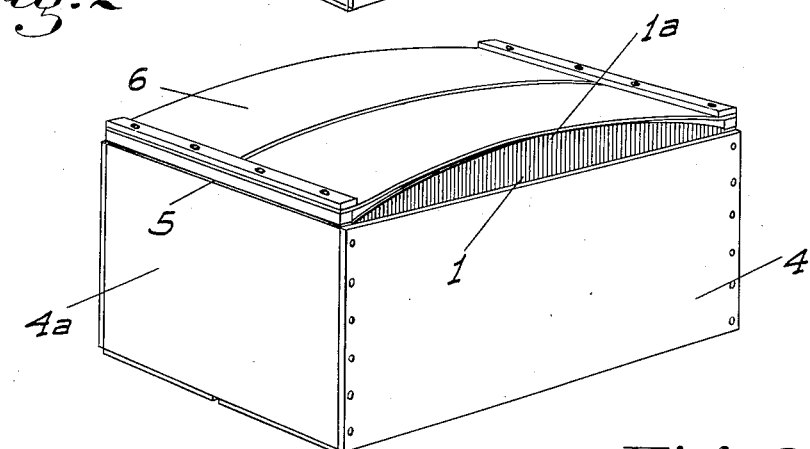
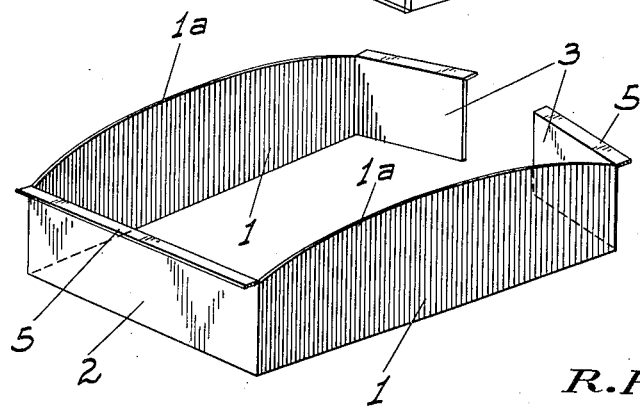
INVENTOR
R. H. Dart
BY
ATTORNEY Patented May 7, 1935

2,000,126

UNITED STATES PATENT OFFICE 2,000,126

LINING COLLAR FOR FRUIT BOXES

Robert H. Dart, Sacramento, Calif., assignor, by mesne assignments, to Carton Development Corporation, New York, N. Y., a corporation of Delaware Application January 13, 1930, Serial No. 420,393

17 Claims. (Cl. 217—3)

This invention relates to removable protecting linings or guards for fruit boxes, especially those in which pears and like fruit is packed, to cover the space always left between the sides of the box and the lid and thus prevent possible damage being done to the fruit during transit.

The protective collar or guard forming the subject matter of this invention is positioned within the box to extend along the top edge of the box side walls, the collar or guard comprising connected or unconnected side sections. Each section extends above the top edge of the box and covers the space between the bulged lid and the top edge of the box side wall. Since the protective collar is considerably shallower than the full depth of the box, means are provided to hold the side sections in position to prevent the same from dropping down into the box, either during the packing operations or during the jolting incident to handling of the box.

The principal object of my invention is to provide a lining collar or guard for fruit boxes having means for definitely supporting the same so that when the lid is placed on and secured to the box the collar will be held in place as a unit with the lid and box.

A further object of the invention is to provide a simple and inexpensive device for protecting boxed fruit which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective outline of a box prior to placing the lid showing the collar as initially disposed therein.

Fig. 2 is a similar view showing the lid as secured in place on the box.

Fig. 3 is a perspective view of the collar detached.

Referring now more particularly to the characters of reference on the drawing, the collar may be formed as a one-piece element comprising side strips or sections 1 connected at one end by an end portion or section 2, the other end of the end sections each being provided with an end or wing portion 3.

The collar is preferably formed of fairly stiff cardboard initially creased at the junction of the side and end portions so that it can be readily bent to the shape of the box from an initially flat extended condition. The total length of the collar is such that when it is thus bent to form it will fit fairly snug in a standard fruit box 4, but the height of the collar is considerably less than the depth of the box. To support the collar at the top of the box I form the end portions 2 and 3 with outwardly bent top flanges 5 adapted to rest on the top of the end members 4a of the box; so that when the lid 6 is nailed onto the box said flanges will be engaged by the nails and the collar as a whole will be rigidly held against movement relative to the box. It will be noted that by means of this arrangement the band and particularly the portion extending above the edge of the container is placed under tension and thus held in a substantially rigid fixed position.

The lids customarily have an upward or convex longitudinally extending bulge as shown and to cover the space between the bulged or bowed lid and the straight sides of the box, the upper edges of the side strips 1 are formed with corresponding convexly curved extensions 1a from end to end, which project above the plane of the upper edges of the end portions 2 and 3, as plainly shown in the drawing.

In packing the box the first two or three layers of fruit are preferably placed therein, the collar is then positioned along the box side walls; and then the final layer or layers of fruit are packed in the box.

From the foregoing description it will be readily seen that I have produced such a device as substantially fulfills the objects of the invention as set forth herein. It is understood that the side sections 1 form the main protective function in preventing injury to the top layer of fruit which would be otherwise exposed between the top edge of the box side wall and the bulged lid. The end portions 2 assist in guiding the guard in position and the overhanging flanges 5 provide a means for supporting the side sections in proper protective position.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A lining collar for a rectangular box comprising a one piece element adapted to fit the inside faces of the box adjacent the upper edges thereof and being of a lesser depth than the box, curving extensions on the sides of the collar to normally project above the corresponding edges of the box when the collar is in position in the box, extensions on the ends of the collar adapted to be bent over and rest on the corresponding box edges, both sets of extensions commencing in a common plane whereby when the end extensions are resting on the corresponding box edges the collar will be suspended in proper position within the box and the side extensions will be held in positive position above their corresponding box edges.

2. A lining collar for a vertical-walled box comprising a member bent to form side and end strips to fit in and extend along the sides and ends of the box and of a height less than that of the box, the upper edges of the side strips having a convex curvature of predetermined radius from end to end to substantially conform to the curvature assumed by the lid of the box when applied, and means formed with the end strips to maintain the ends of the curved edges on a level with the top of the box.

3. Fruit guard for bulge-packed crates comprising a sheet member adapted to fit within the open top of a crate having a body portion adapted to extend above the sides of the crate, and end portions foldable relative to the body portion, the end portions having flanges adapted to rest on the ends of the crate, and the body portion being constructed wider intermediately than at the ends so as to span the length of the crate without sagging.

4. A fruit package comprising a box having a bottom wall and four side walls, a U-shaped fruit guard positioned in said box between said box sides and the top layers of fruit, said guard comprising side sections, a connecting end portion, wing end portions, and means extending from said end portions limiting the downward movement of said guard, said side sections extending above the adjacent side walls for closing the gap between said side walls and said cover.

5. A fruit package comprising a box having a bottom wall and four side walls, a fruit guard positioned in said box between said box sides and the top layers of fruit, said guard comprising side sections seated against opposite box side walls, end portions, and projecting means extending from said end portions limiting the downward movement of said guard, the side sections of said guard extending above the box side walls a distance substantially as great as the top layer of fruit.

6. A fruit guard for a vertical walled box comprising a paperboard strip having a pair of side wall sections extending along opposite sides of the box and projecting above the top edge thereof so as to close the gap between the box and the bulged lid when the lid is applied, an intermediate portion connecting the side wall sections extending along an intermediate box wall, and means extending from said intermediate and side wall sections for maintaining the fruit guard in fixed position with respect to the top edge of the box.

7. A fruit guard comprising a band of paperboard having a side wall section adapted to engage a side wall of a fruit box the full length thereof, and an end wall portion hinged to the side wall section, said end wall portion being adapted to abut the box end wall, said side wall portion having an arcuate top edge shaped to substantially conform to the bulged contour of the box cover, said end wall portion having a lip resting on the top edge of the box end wall and supporting said guard in operative position.

8. A fruit package comprising a box having a bottom wall and four side walls, a fruit guard positioned in said box between said box and top layer of fruit, said guard comprising a side wall section seated against the inside face of one of the side walls and extending the full length thereof, end portions hinged to and extending from said side wall section seated against the inside face of the adjacent box side walls, and means laterally extending from the guard and engaging the box side walls for limiting the downward movement of said guard during packing, shipment and storage.

9. A fruit package comprising a box having a polygonal shaped bottom wall and surrounding side walls, a fruit guard formed of paperboard material positioned in said box between said box and the top layer of fruit, said guard comprising a side wall section seated against the inside face of one of the box side walls and extending the full length thereof, an end portion hinged to and extending from an end of said side section and seated against the inside of the adjacent side wall, means extending from said end portion overhanging and engaging the top edge of said side wall, said side wall section extending above the side of said box a distance at least as great as the top layer of fruit.

10. A fruit package comprising a box having a bottom wall and four side walls, a flexible cover adapted to be secured to the top edge of opposite side walls and to arch upwardly a substantial distance above the top edge of the other two side walls, a fruit guard formed from paperboard material mounted within said box adjacent the top layer of fruit, said guard comprising a side section extending the length of one of said side walls, an end portion hinged to said side section and seated against the inside face of the adjacent side wall, and means for limiting the downward movement of said guard, the side section of said guard extending above the adjacent side wall a distance sufficient to close the gap between said side wall and said cover.

11. A fruit guard for bulged packed crates comprising a strip of paperboard material adapted to fit within the open top of the crate, said strip including a side portion extending the length of one side wall and projecting above the top edge thereof, an end portion extending from an end of the body portion seated against the inside face of the adjacent side wall, and a flange extending from said end portion resting on the top edge of the adjacent side wall supporting the guard in operative position.

12. A fruit package including in combination, a box having a bottom wall and enclosing side walls, a bowed lid therefor, and a protective guard for the fruit packed therein comprising a relatively stiff band to be placed within the container along an outer edge of the container, said guard having a curving extension above such edge to substantially bridge the space between such edge and applied bowed lid, said guard having a projecting element adapted to engage one of the box side walls to maintain said guard in fruit protecting position during packing, shipment and storage.

13. An edge guard for a fruit container having a lid which is bowed outwardly intermediate its ends, leaving a space between the top edge of a wall of the container and the bowed lid, said guard including a band to be positioned along the top edge of said wall and extending above such edge, said band extending substantially the full distance between two opposite walls of the container, the outer margin of said band being curved on an outbow from substantially one end of the band to the other in approximate conformity with the bowed contour of the lid.

14. An edge guard for a fruit container having a lid which is bowed outwardly intermediate its ends leaving a space between the top edge of a wall of the container and the bowed lid, said guard including a band to be positioned along the top edge of said wall and extending above such edge, said band extending substantially the full distance between two opposite walls of the container, the outer margin of said band being curved on an outbow from substantially one end of the band to the other in approximate conformity to the bowed contour of the lid, the band having means to engage the adjacent container walls to support the band in applied position.

15. An edge guard for use with a fruit box having side and end walls, the top edges of which lie in substantially the same plane, and a lid applied to said box which is bowed outwardly intermediate its ends leaving a space between the top edge of the side walls and the lid, said guard including a band of paperboard material to be positioned along the upper edge of a side wall of the box to bridge the space between the top edge of the box and the bowed lid, said band also extending within the box and having means to engage the box for initially supporting the band in applied position.

16. A package for fruits and vegetables comprising a box having a bottom, side, and end walls, and a lid applied to said box which is bowed outwardly intermediate its ends leaving a space between the top edge of the side walls and the lid when the box has been packed with contents and the lid applied, and an edge guard adapted to be inserted within the box during the packing of the contents, said guard having a side wall portion extending between said end walls and projecting partially above the adjacent side wall, means carried by the guard engaging the box and supporting the guard in applied position, said side wall portion extending above the top edge of the box, closing the space between the side walls and the lid when the lid has been applied.

17. A package for fruits and vegetables comprising a box having a bottom, side, and end walls, and a lid applied to said box which is bowed outwardly intermediate its ends leaving a space between the top edge of the side walls and the lid when the box has been packed with contents and the lid applied, and a protective guard for the fruit packed therein including a relatively stiff band placed within and along an outer edge of the container, said band having a portion extending above such edge to substantially bridge the space between such edge and applied bowed lid and means to hold said portion under tension and in substantially rigid fixed position during shipment and storage.

ROBERT H. DART.